(12) United States Patent
Lwo

(10) Patent No.: US 7,877,399 B2
(45) Date of Patent: Jan. 25, 2011

(54) METHOD, SYSTEM, AND COMPUTER PROGRAM PRODUCT FOR COMPARING TWO COMPUTER FILES

(75) Inventor: Fuhwei Lwo, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1210 days.

(21) Appl. No.: 10/641,959

(22) Filed: Aug. 15, 2003

(65) Prior Publication Data

US 2005/0039117 A1 Feb. 17, 2005

(51) Int. Cl.
*G06F 7/00* (2006.01)
(52) U.S. Cl. .................. 707/758; 707/797; 707/811
(58) Field of Classification Search .............. 707/3, 707/100, 104.1, 10, 7, 758, 797, 811; 715/513, 715/514
See application file for complete search history.

(56) References Cited

U.S. PATENT DOCUMENTS

| | | | | |
|---|---|---|---|---|
| 6,098,071 | A * | 8/2000 | Aoyama et al. ............... | 1/1 |
| 6,502,112 | B1 * | 12/2002 | Baisley ....................... | 715/210 |
| 6,560,620 | B1 * | 5/2003 | Ching ....................... | 715/229 |
| 6,606,620 | B1 * | 8/2003 | Sundaresan et al. .................. | 1/1 |
| 6,826,726 | B2 * | 11/2004 | Hsing et al. .................. | 715/234 |
| 6,848,078 | B1 * | 1/2005 | Birsan et al. ................. | 715/206 |
| 6,978,420 | B2 * | 12/2005 | Ching ....................... | 715/229 |
| 7,240,279 | B1 * | 7/2007 | Chartier et al. .............. | 715/210 |
| 2002/0038320 | A1 * | 3/2002 | Brook ......................... | 707/513 |
| 2002/0133497 | A1 * | 9/2002 | Draper et al. ................. | 707/100 |
| 2002/0161801 | A1 * | 10/2002 | Hind et al. ................... | 707/513 |
| 2002/0174147 | A1 * | 11/2002 | Wang et al. .................. | 707/513 |
| 2003/0023615 | A1 * | 1/2003 | Beged-Dov et al. .......... | 707/200 |
| 2003/0126554 | A1 * | 7/2003 | Behzadi et al. ........... | 715/501.1 |
| 2003/0126556 | A1 * | 7/2003 | Soetarman et al. ........... | 715/513 |
| 2003/0126929 | A1 * | 7/2003 | Miller et al. ................... | 73/663 |
| 2004/0060007 | A1 * | 3/2004 | Gottlob et al. ............... | 715/513 |
| 2004/0103124 | A1 * | 5/2004 | Kupkova ..................... | 707/203 |
| 2004/0205454 | A1 * | 10/2004 | Gansky et al. .............. | 715/500 |
| 2005/0010606 | A1 * | 1/2005 | Kaiser et al. ................ | 707/200 |

* cited by examiner

*Primary Examiner*—Eliyah S Harper
(74) *Attorney, Agent, or Firm*—Joseph E. Bracken, Esq.; Steven M. Greenberg, Esq.; Carey Rodriguez Greenberg & Paul LLP

(57) ABSTRACT

A method and system for comparing two documents, such as XML (Extensible Markup Language) files, where each document is capable of being parsed into a DOM (Document Object Model) trees. Each tree structure is converted into an array of leaf paths containing nodes. These arrays are then compared to identify corresponding matched nodes—either exactly matched nodes or schema matched nodes. In reporting the results of the comparison, unmatched nodes of the source document are reported as "deleted nodes", that is, existing in the source but not in the target. Similarly all unmatched nodes of the target document are reported as "added nodes", that is, existing in the target but not in the source. In addition, schema matched nodes are reported as "modified nodes" between source and target documents.

27 Claims, 31 Drawing Sheets

XML

```
<?xml version="1.0" encoding="UTF-8"?>

<!-- Comment1. -->
<package name="myumlpackage">
    <!-- Comment2. -->

<class name = "umlclass1"/>  <class name="umlclass2"/>
    text node
    <class name="umlclass3">Class3 Text</class>
</package>
```

6 Leaf Paths

| #document (xml) | #comment (Comment1) |
|---|---|

Leaf Path Depth = 2

| #document (xml) | package (myumlpackage) | #comment (Comment2) |
|---|---|---|

Leaf Path Depth = 3

| #document (xml) | package (myumlpackage) | class (umlclass1) |
|---|---|---|

| #document (xml) | package (myumlpackage) | class (umlclass2) |
|---|---|---|

| #document (xml) | package (myumlpackage) | #text (text node) |
|---|---|---|

| #document (xml) | package (myumlpackage) | class (umlclass3) | #text (Class3 Text) |
|---|---|---|---|

Sourc XML File

```xml
<?xml version="1.0" encoding="UTF-8"?>

<!-- Package information. -->
<package name="server" desc="Contains server classes.">
    <!-- Class information -->
    <class name = "AppServer" desc="Application server">
        <attribute name="IBMServer"/>
    </class>
    <class name="MailServer" desc="Mail server">
        <attribute name="URL">www.yahoo.com</attribute>
    </class>
</package>
<package name="client" desc="Contains client classes.">
    <class name="Browser" desc="Internet browser">
        <attribute name="product">Internet Explorer</attribute>
        <attribute name="version">5.0</attribute>
    </class>
</package>
```

Fig. 8B

Target XML File

```xml
<?xml version="1.0" encoding="UTF-8"?>

<!-- Package information. -->
<package name="server" desc="Contains server classes.">
    <!-- Class information -->
    <class name = "AppServer" desc="Application server">
        <attribute name="IBMServer"/>
    </class>
</package>
<package name="client" desc="Contains client classes.">
    <class name="Browser" desc="Internet browser">
        <attribute name="product">Internet Explorer</attribute>
        <attribute name="version">6.0</attribute>
    </class>
    <class name="Standalone" desc="Java App">
        <attribute name="product">Acme</attribute>
        <attribute name="version">7.0</attribute>
    </class>
</package>
```

Source DOM

Target DOM

Fig. 10A

Source Leaf Paths

6 Leaf Paths

| # | | | | | |
|---|---|---|---|---|---|
| #1 | #document (xml) | #comment (Pakcage information) | Leaf Path Depth = 2 | | |
| #2 | #document (xml) | package (name="server") (desc="Contains server classes.") | #comment (Class information) | Leaf Path Depth = 3 | |
| #3 | #document (xml) | package (name="server") (desc="Contains server classes.") | class (name="AppServer") (desc="Application server") | attribute (name="IBMServer") | |
| #4 | #document (xml) | package (name="server") (desc="Contains server classes.") | class (name="MailServer") (desc="Mail server") | attribute (name="URL") | #text (www.yahoo.com) |
| #5 | #document (xml) | package (name="client") (desc="Contains client classes.") | class (name="Browser") (desc="Internet browser") | attribute (name="product") | #text (Internet Explorer) |
| #6 | #document (xml) | package (name="client") (desc="Contains client classes.") | class (name="Browser") (desc="Internet browser") | attribute (name="version") | #text (5.0) |

Fig. 10B

Target Leaf Paths

7 Leaf Paths

| # | | | | | |
|---|---|---|---|---|---|
| #1 | #document (xml) | #comment (Pakcage information) | Leaf Path Depth = 2 | | |
| #2 | #document (xml) | package (name="server") (desc="Contains server classes.") | #comment (Class information) | Leaf Path Depth = 3 | |
| #3 | #document (xml) | package (name="server") (desc="Contains server classes.") | class (name="AppServer") (desc="Application server") | attribute (name="IBMServer") | |
| #4 | #document (xml) | package (name="client") (desc="Contains client classes.") | class (name="Browser") (desc="Internet browser") | attribute (name="product") | #text (Internet Explorer) |
| #5 | #document (xml) | package (name="client") (desc="Contains client classes.") | class (name="Browser") (desc="Internet browser") | attribute (name="version") | #text (6.0) |
| #6 | #document (xml) | package (name="client") (desc="Contains client classes.") | class (name="Standalon") (desc="Java App") | attribute (name="product") | #text (Acme) |
| #7 | #document (xml) | package (name="client") (desc="Contains client classes.") | class (name="Standalon") (desc="Java App") | attribute (name="version") | #text (7.0) |

Target DOM

Sourc L af Paths

6 Leaf Paths

1 | #document (xml) | #comment (Pakcage information) | "matched"

2 | #document (xml) | package (name="server") (desc="Contains server classes.") | #comment (Class information)

3 | #document (xml) | package (name="server") (desc="Contains server classes.") | class (name="AppServer") (desc="Application server") | attribute (name="IBMServer")

4 | #document (xml) | package (name="server") (desc="Contains server classes.") | class (name="MailServer") (desc="Mail server") | attribute (name="URL") | #text (www.yahoo.com)

5 | #document (xml) | package (name="client") (desc="Contains client classes.") | class (name="Browser") (desc="Internet browser") | attribute (name="product") | #text (Internet Explorer)

6 | #document (xml) | package (name="client") (desc="Contains client classes.") | class (name="Browser") (desc="Internet browser") | attribute (name="version") | #text (5.0)

Fig. 12A

Targ t Leaf Paths

7 Leaf Paths

| # | | | | | |
|---|---|---|---|---|---|
| #1 | #document (xml) | #comment (Pakcage information) | "matched" | | |
| #2 | #document (xml) | package (name="server") (desc="Contains server classes.") | #comment (Class information) | | |
| #3 | #document (xml) | package (name="server") (desc="Contains server classes.") | class (name="AppServer") (desc="Application server") | attribute (name="IBMServer") | |
| #4 | #document (xml) | package (name="client") (desc="Contains client classes.") | class (name="Browser") (desc="Internet browser") | attribute (name="product") | #text (Internet Explorer) |
| #5 | #document (xml) | package (name="client") (desc="Contains client classes.") | class (name="Browser") (desc="Internet browser") | attribute (name="version") | #text (6.0) |
| #6 | #document (xml) | package (name="client") (desc="Contains client classes.") | class (name="Standalon") (desc="Java App") | attribute (name="product") | #text (Acme) |
| #7 | #document (xml) | package (name="client") (desc="Contains client classes.") | class (name="Standalon") (desc="Java App") | attribute (name="version") | #text (7.0) |

Fig. 12B

Fig. 13A
Sourc DOM
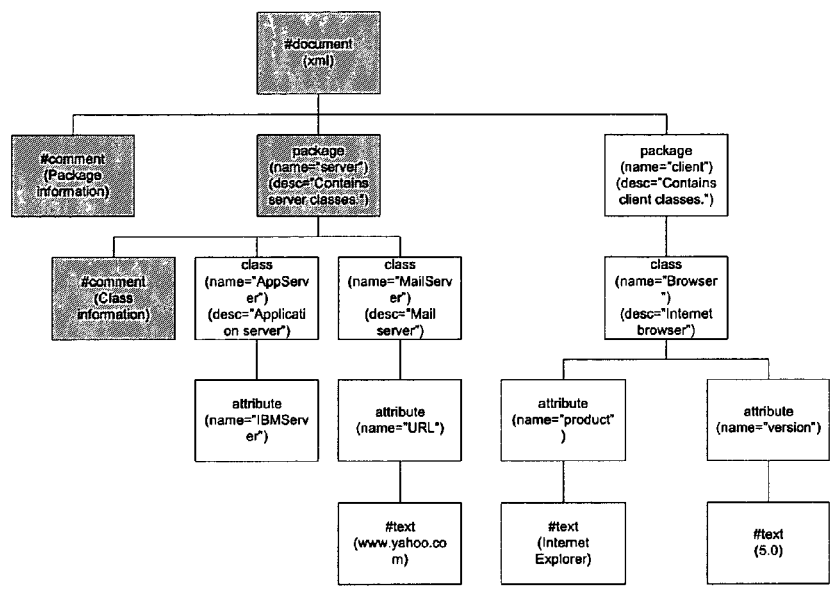
Target DOM
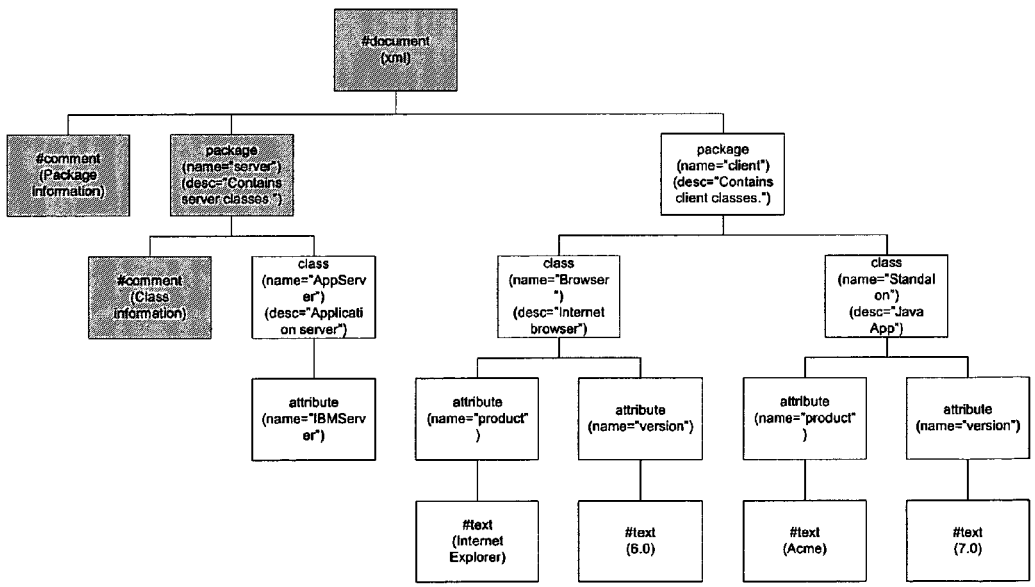
Fig. 13B

Source L af Paths

6 Leaf Paths

| # | | | | | |
|---|---|---|---|---|---|
| #1 | #document (xml) | #comment (Pakcage information) | "matched" | | |
| #2 | #document (xml) | package (name="server") (desc="Contains server classes.") | #comment (Class information) | "matched" | |
| #3 | #document (xml) | package (name="server") (desc="Contains server classes.") | class (name="AppServer") (desc="Application server") | attribute (name="IBMServer") | |
| #4 | #document (xml) | package (name="server") (desc="Contains server classes.") | class (name="MailServer") (desc="Mail server") | attribute (name="URL") | #text (www.yahoo.com) |
| #5 | #document (xml) | package (name="client") (desc="Contains client classes.") | class (name="Browser") (desc="Internet browser") | attribute (name="product") | #text (Internet Explorer) |
| #6 | #document (xml) | package (name="client") (desc="Contains client classes.") | class (name="Browser") (desc="Internet browser") | attribute (name="version") | #text (5.0) |

Fig. 14A

Target Leaf Paths

7 Leaf Paths

| # | | | | | |
|---|---|---|---|---|---|
| #1 | #document (xml) | #comment (Pakcage information) | "matched" | | |
| #2 | #document (xml) | package (name="server") (desc="Contains server classes.") | #comment (Class information) | "matched" | |
| #3 | #document (xml) | package (name="server") (desc="Contains server classes.") | class (name="AppServer") (desc="Application server") | attribute (name="IBMServer") | |
| #4 | #document (xml) | package (name="client") (desc="Contains client classes.") | class (name="Browser") (desc="Internet browser") | attribute (name="product") | #text (Internet Explorer) |
| #5 | #document (xml) | package (name="client") (desc="Contains client classes.") | class (name="Browser") (desc="Internet browser") | attribute (name="version") | #text (6.0) |
| #6 | #document (xml) | package (name="client") (desc="Contains client classes.") | class (name="Standalon") (desc="Java App") | attribute (name="product") | #text (Acme) |
| #7 | #document (xml) | package (name="client") (desc="Contains client classes.") | class (name="Standalon") (desc="Java App") | attribute (name="version") | #text (7.0) |

Fig. 14B

Fig. 15A
Source DOM
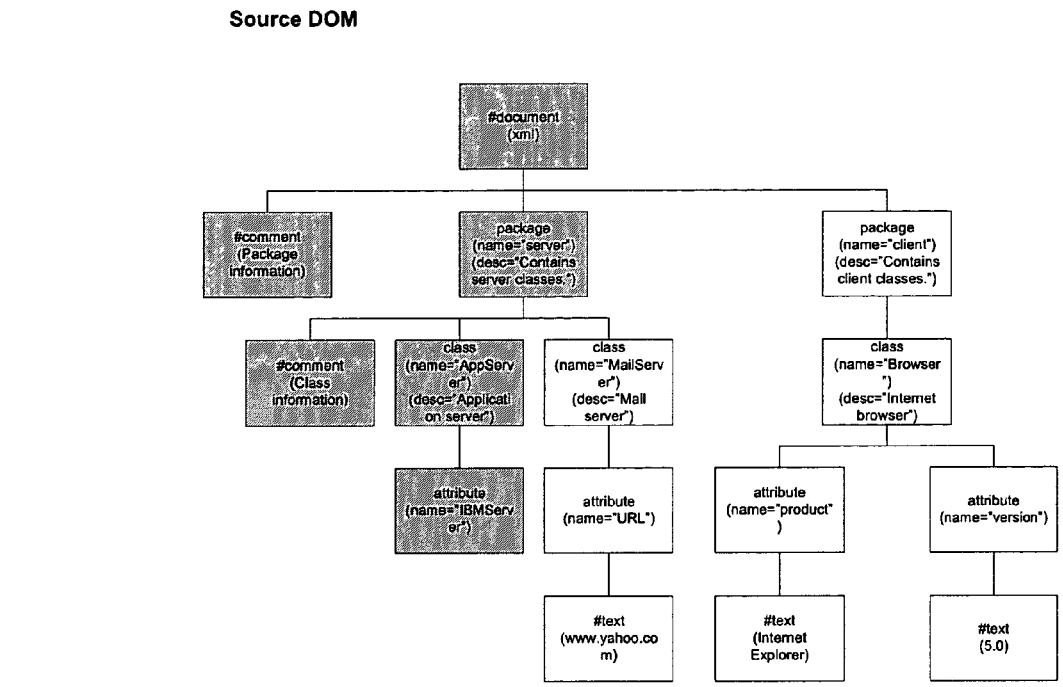
Target DOM
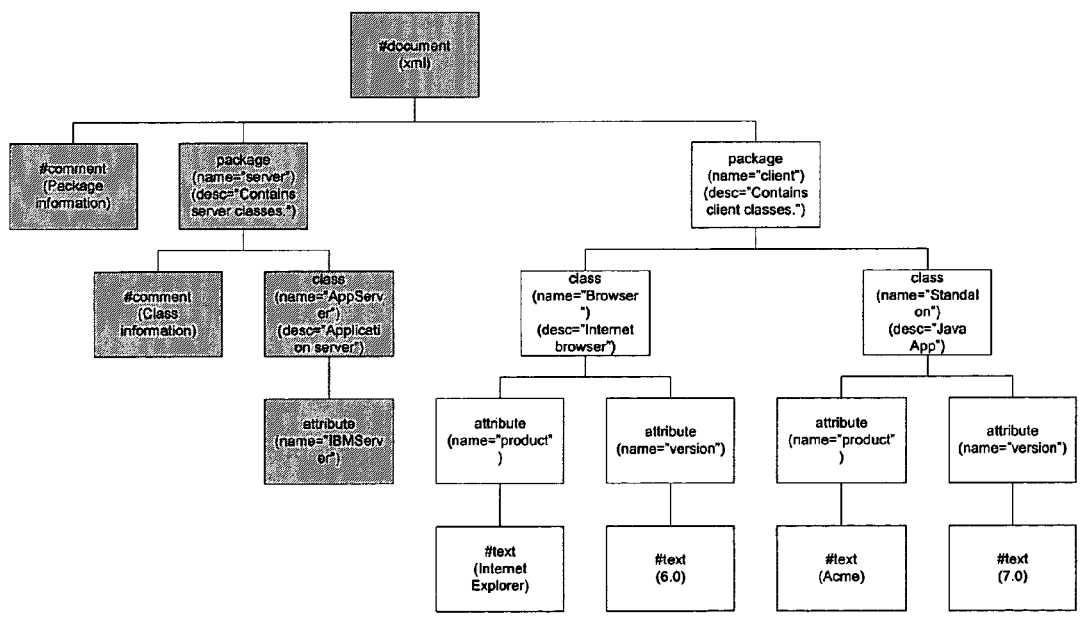
Fig. 15B

Source Leaf Paths

6 Leaf Paths

| # | | | | | |
|---|---|---|---|---|---|
| #1 | #document (xml) | #comment (Pakcage information) | "matched" | | |

| #2 | #document (xml) | package (name="server") (desc="Contains server classes.") | #comment (Class information) | "matched" | |

| #3 | #document (xml) | package (name="server") (desc="Contains server classes.") | class (name="AppServer") (desc="Application server") | attribute (name="IBMServer") | "matched" |

| #4 | #document (xml) | package (name="server") (desc="Contains server classes.") | class (name="MailServer") (desc="Mail server") | attribute (name="URL") | #text (www.yahoo.com) |

| #5 | #document (xml) | package (name="client") (desc="Contains client classes.") | class (name="Browser") (desc="Internet browser") | attribute (name="product") | #text (Internet Explorer) |

| #6 | #document (xml) | package (name="client") (desc="Contains client classes.") | class (name="Browser") (desc="Internet browser") | attribute (name="version") | #text (5.0) |

Fig. 16A

Target Leaf Paths

7 Leaf Paths

| # | Path | |
|---|---|---|
| #1 | #document (xml) → #comment (Pakcage information) | "matched" |
| #2 | #document (xml) → package (name="server") (desc="Contains server classes.") → #comment (Class information) | "matched" |
| #3 | #document (xml) → package (name="server") (desc="Contains server classes.") → class (name="AppServer") (desc="Application server") → attribute (name="IBMServer") | "matched" |

| # | | package | class | attribute | #text |
|---|---|---|---|---|---|
| #4 | #document (xml) | (name="client") (desc="Contains client classes.") | (name="Browser") (desc="Internet browser") | (name="product") | (Internet Explorer) |
| #5 | #document (xml) | (name="client") (desc="Contains client classes.") | (name="Browser") (desc="Internet browser") | (name="version") | (6.0) |
| #6 | #document (xml) | (name="client") (desc="Contains client classes.") | (name="Standalon") (desc="Java App") | (name="product") | (Acme) |
| #7 | #document (xml) | (name="client") (desc="Contains client classes.") | (name="Standalon") (desc="Java App") | (name="version") | (7.0) |

Fig. 16B

Source Leaf Paths

6 Leaf Paths

1 | #document (xml) | #comment (Package information) | "matched"

2 | #document (xml) | package (name="server") (desc="Contains server classes.") | #comment (Class information) | "matched"

3 | #document (xml) | package (name="server") (desc="Contains server classes.") | class (name="AppServer") (desc="Application server") | attribute (name="IBMServer") | "matched"

4 | #document (xml) | package (name="server") (desc="Contains server classes.") | class (name="MailServer") (desc="Mail server") | attribute (name="URL") | #text (www.yahoo.com)

5 | #document (xml) | package (name="client") (desc="Contains client classes.") | class (name="Browser") (desc="Internet browser") | attribute (name="product") | #text (Internet Explorer) | "matched"

6 | #document (xml) | package (name="client") (desc="Contains client classes.") | class (name="Browser") (desc="Internet browser") | attribute (name="version") | #text (5.0)

Fig. 18A

Target Leaf Paths

7 Leaf Paths

1 | #document (xml) | #comment (Pakcage information) | "matched"

2 | #document (xml) | package (name="server") (desc="Contains server classes.") | #comment (Class information) | "matched"

3 | #document (xml) | package (name="server") (desc="Contains server classes.") | class (name="AppServer") (desc="Application server") | attribute (name="IBMServer") | "matched"

4 | #document (xml) | package (name="client") (desc="Contains client classes.") | class (name="Browser") (desc="Internet browser") | attribute (name="product") | #text (Internet Explorer) | "matched"

5 | #document (xml) | package (name="client") (desc="Contains client classes.") | class (name="Browser") (desc="Internet browser") | attribute (name="version") | #text (6.0)

6 | #document (xml) | package (name="client") (desc="Contains client classes.") | class (name="Standalon") (desc="Java App") | attribute (name="product") | #text (Acme)

7 | #document (xml) | package (name="client") (desc="Contains client classes.") | class (name="Standalon") (desc="Java App") | attribute (name="version") | #text (7.0)

New Source Leaf Paths

2 Leaf Paths

| | | | | | |
|---|---|---|---|---|---|
| #1 | #document (xml) | package (name="server") (desc="Contains server classes.") | class (name="MailServer") (desc="Mail server") | attribute (name="URL") | #text (www.yahoo.com) |

| | | | | | |
|---|---|---|---|---|---|
| #2 | #document (xml) | package (name="client") (desc="Contains client classes.") | class (name="Browser") (desc="Internet browser") | attribute (name="version") | #text (5.0) |

Fig. 19B

New Target Leaf Paths

3 Leaf Paths

| | | | | | |
|---|---|---|---|---|---|
| #1 | #document (xml) | package (name="client") (desc="Contains client classes.") | class (name="Browser") (desc="Internet browser") | attribute (name="version") | #text (6.0) |

| | | | | | |
|---|---|---|---|---|---|
| #2 | #document (xml) | package (name="client") (desc="Contains client classes.") | class (name="Standalon") (desc="Java App") | attribute (name="product") | #text (Acme) |

| | | | | | |
|---|---|---|---|---|---|
| #3 | #document (xml) | package (name="client") (desc="Contains client classes.") | class (name="Standalon") (desc="Java App") | attribute (name="version") | #text (7.0) |

Source DOM

Target DOM

Fig. 21A

New Source Leaf Paths

2 Leaf Paths

| | | | | | |
|---|---|---|---|---|---|
| #1 | #document (xml) | package (name="server") (desc="Contains server classes.") | class (name="MailServer") (desc="Mail server") | attribute (name="URL") | #text (www.yahoo.com) |

| | | | | | |
|---|---|---|---|---|---|
| #2 | #document (xml) | package (name="client") (desc="Contains client classes.") | class (name="Browser") (desc="Internet browser") | attribute (name="version") | #text (5.0) |

Fig. 21B

New Target Leaf Paths

3 Leaf Paths

| | | | | | |
|---|---|---|---|---|---|
| #1 | #document (xml) | package (name="client") (desc="Contains client classes.") | class (name="Browser") (desc="Internet browser") | attribute (name="version") | #text (6.0) |

| | | | | | |
|---|---|---|---|---|---|
| #2 | #document (xml) | package (name="client") (desc="Contains client classes.") | class (name="Standalon") (desc="Java App") | attribute (name="product") | #text (Acme) |

| | | | | | |
|---|---|---|---|---|---|
| #3 | #document (xml) | package (name="client") (desc="Contains client classes.") | class (name="Standalon") (desc="Java App") | attribute (name="version") | #text (7.0) |

Target DOM

Fig. 23

Source XML File

```
<?xml version="1.0" encoding="UTF-8"?>

<!-- Package information. -->
<package name="server" desc="Contains server classes.">
    <!-- Class information -->
    <class name = "AppServer" desc="Application server">
        <attribute name="IBMServer"/>
    </class>
    <class name="MailServer" desc="Mail server">
        <attribute name="URL">www.yahoo.com</attribute>
    </class>
</package>
<package name="client" desc="Contains client classes.">
    <class name="Browser" desc="Internet browser">
        <attribute name="product">Internet Explorer</attribute>
        <attribute name="version">_5.0_</attribute>
    </class>
</package>
```

Target XML Fil

```
<?xml version="1.0" encoding="UTF-8"?>

<!-- Package information. -->
<package name="server" desc="Contains server classes.">
    <!-- Class information -->
    <class name = "AppServer" desc="Application server">
        <attribute name="IBMServer"/>
    </class>

</package>
<package name="client" desc="Contains client classes.">
    <class name="Browser" desc="Internet browser">
        <attribute name="product">Internet Explorer</attribute>
        <attribute name="version">_6.0_</attribute>
    </class>
    <class name="Standalone" desc="Java App">
        <attribute name="product">Acme</attribute>
        <attribute name="version">7.0</attribute>
    </class>
</package>
```

METHOD, SYSTEM, AND COMPUTER PROGRAM PRODUCT FOR COMPARING TWO COMPUTER FILES

BACKGROUND OF THE INVENTION

1. Field of the Invention

The present invention relates generally to comparing two files each file being capable of being parsed into DOM (Document Object Model) trees.

2. Description of the Related Art

Traditional file compare programs compare two files without considering the meaning of the contents of the two files. That is, they basically look at the two files as raw data, compare them byte by byte, and report the differences. When the files relate for example, to object-oriented computer programs such as XML (Extensible Markup Language), the output of such a traditional file compare is huge. Moreover this output is essentially unreadable and, thus, essentially useless.

XML is a relatively new document format designed to bring structure information to the Web. The XML document format embeds content within tags that express the structure of the document. XML provides the user with the ability to express rules, known collectively as an XML Schema, for the structure of a document. An XML document mainly contains elements and attributes that are used to describe data. Because XML was designed to describe data, format items such as white spaces, tabs, new line characters and even the actual order in which elements and attributes appear in the XML file are not of significant interest to the users. In comparing XML files, a traditional file compare application does not consider the syntax and semantics of these files. Consequently, format differences and differences in the order of appearance of elements and attributes will be reported. The reporting of these types of "differences" will typically be significant in number and have no value in a worthwhile comparison of the documents. Moreover they make any meaningful differences reported in the voluminous data difficult for a user to recognize, i.e., the meaningful differences are "buried" among the irrelevant differences.

Accordingly, it would be desirable to have a method for comparing two documents syntactically and semantically to report meaningful differences between them even when irrelevant differences, e.g., the order of the elements contained therein, are also existing between the two documents.

SUMMARY OF THE INVENTION

The present invention relates to comparing two documents capable of being parsed into DOM (Document Object Model) trees. While the following discussion uses XML files as an example, the invention is not so limited as other computer documents, C++ and Java programs for example, are contemplated as being able to be compared by the invention.

In the following discussion one of the documents being compared is designated as the "source document" and the other document is designated as the "target document". A DOM tree structure is created for each of these documents. Each tree structure is then converted to an array of leaf paths containing nodes, a source array and a target array, respectively. Each leaf path in the source array is then compared to the leaf paths in the target array to identify completely matched leaf paths. The creation and matching of leaf paths in this manner renders irrelevant the order in which elements and attributes appear in the documents, thereby overcoming a significant problem in the prior art.

In comparing the leaf paths, a leaf path is deemed completely matched if all nodes in the path have the same schema and values. If a complete match is not found for a source leaf path, an attempt is made to identify loosely matched leaf paths wherein their corresponding nodes may have the same schema but different values. In such loosely matched leaf paths, there may be both completely matched nodes and loosely matched nodes.

The system outputs the comparison results once all source and target leaf paths have been compared and the invention has identified and flagged all completely and loosely matched leaf paths in the two documents. In various embodiments of the invention all unflagged nodes in the source document are then reported as "deleted nodes"—existing in the source but not in the target. Similarly all unflagged nodes in the target document are reported as "added nodes"—existing in the target but not in the source. Loosely match leaf paths are reported as "modified nodes" between source and target.

BRIEF DESCRIPTION OF THE DRAWINGS

FIG. 2 is a table of leaf paths corresponding to the DOM model of FIG. 1B;

FIGS. 8A and 8B are illustrative XML files that are compared using an embodiment of the invention;

FIGS. 10A and 10B are tables of leaf paths corresponding to the DOM models of FIGS. 9A and 9B, respectively;

FIGS. 12A and 12B illustrate how matched nodes of the corresponding leaf paths are identified in the appropriate leaf path tables;

FIGS. 13A, 13B, 14A, 14B, 15A, 15B, 16A, 16B, 17A, 17B, 18A and 18B further illustrate how recursive applications of the steps of the invention yield additional leaf path "exact matches" that are identified in the DOM models and leaf path tables;

FIGS. 19A and 19B illustrate source and target leaf paths for which an exact match was not attained and for which a "schema match" algorithm will be applied;

FIGS. 20A, 20B, 21A and 21B illustrate an intermediate step in the "schema match" algorithm where exactly matched nodes have been identified in the DOM models and leaf path tables;

DETAILED DESCRIPTION

The present invention describes a system and method for comparing two documents that are capable of being parsed into DOM (Document Object Model) trees. Such documents contain an inherent defined structure in addition to data content. XML files, C++ programs, and Java programs are examples of such documents. The following discussion will describe the invention in terms of its application to XML documents although the invention is not so limited. Any document which can be parsed into a DOM tree can be compared to a similar document by the invention described herein.

Figures 1A, 1B:
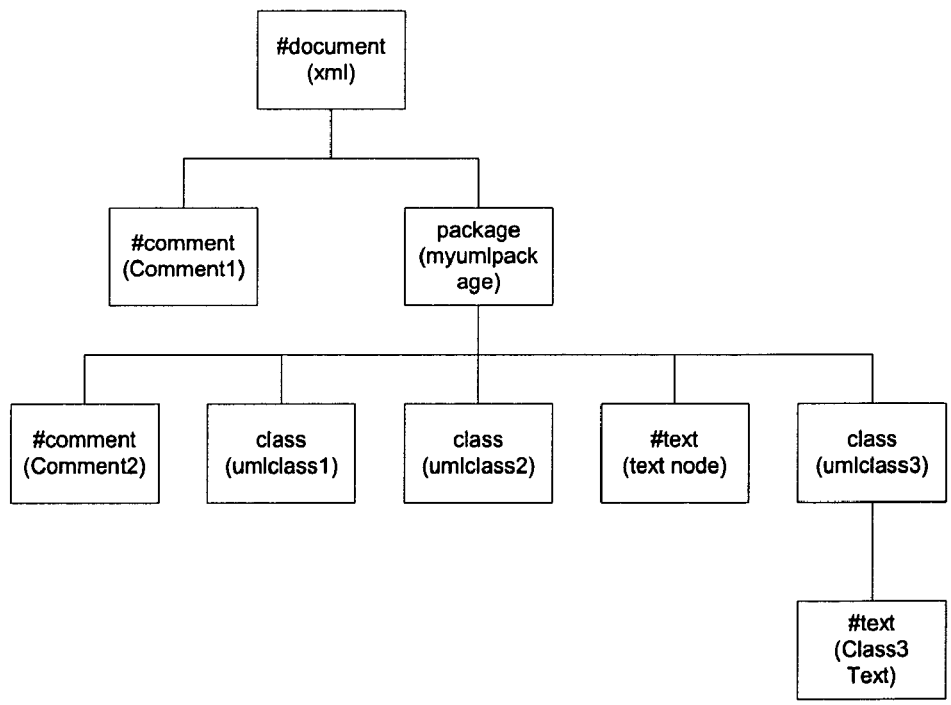
FIG. 1A is an example of an XML file.
FIG. 1B is a Document Object Model (DOM) corresponding to the XML file of FIG. 1A.

FIG. 1A is an example of an XML document. FIG. 1B is a corresponding DOM tree that is readily obtained by well-known parsers in the prior art. Examples of such parsers are found at http://xml.apache.org. Various format items such as white spaces, tab, and new line characters are removed in the tree structure.

For each document to be compared, its DOM tree is converted to leaf paths that contain nodes. FIG. 2 illustrates the results obtained when the DOM tree of FIG. 1B is so converted. In particular, 6 leaf paths are listed with path depths of 2 to 4 nodes. In comparing a source document and a target document, a corresponding table of leaf paths is created for each document. That is, a source table is created whose entries are leaf paths corresponding to the source document (these table entries are referred to herein as "source leaf paths"). Similarly, a target table is created whose entries are leaf paths corresponding to the target document (these table entries are referred to herein as "target leaf paths").

Figure 3:
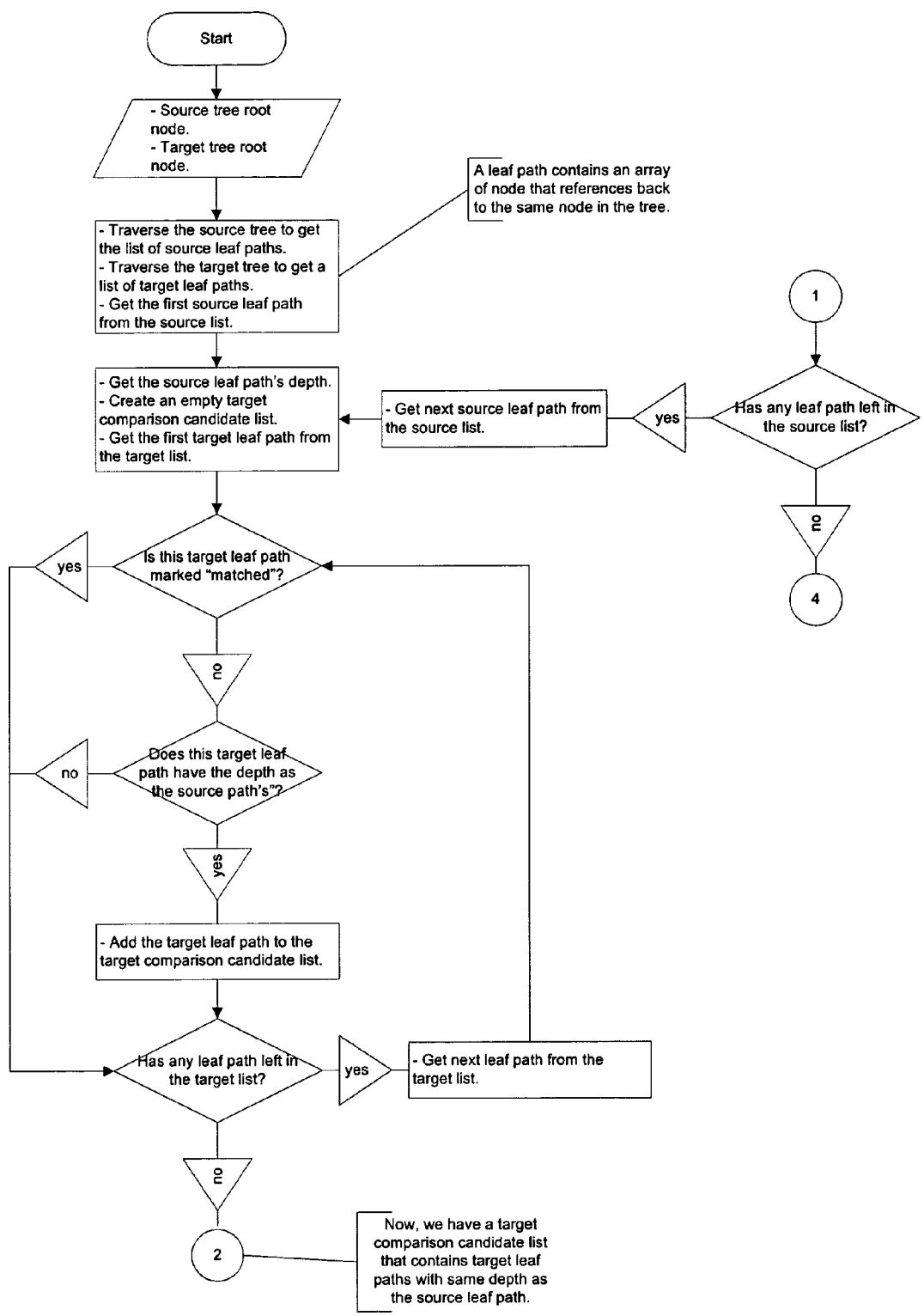
FIG. 3 illustrates a flow chart describing the steps of deriving a target comparison candidate list.
Figure 4:
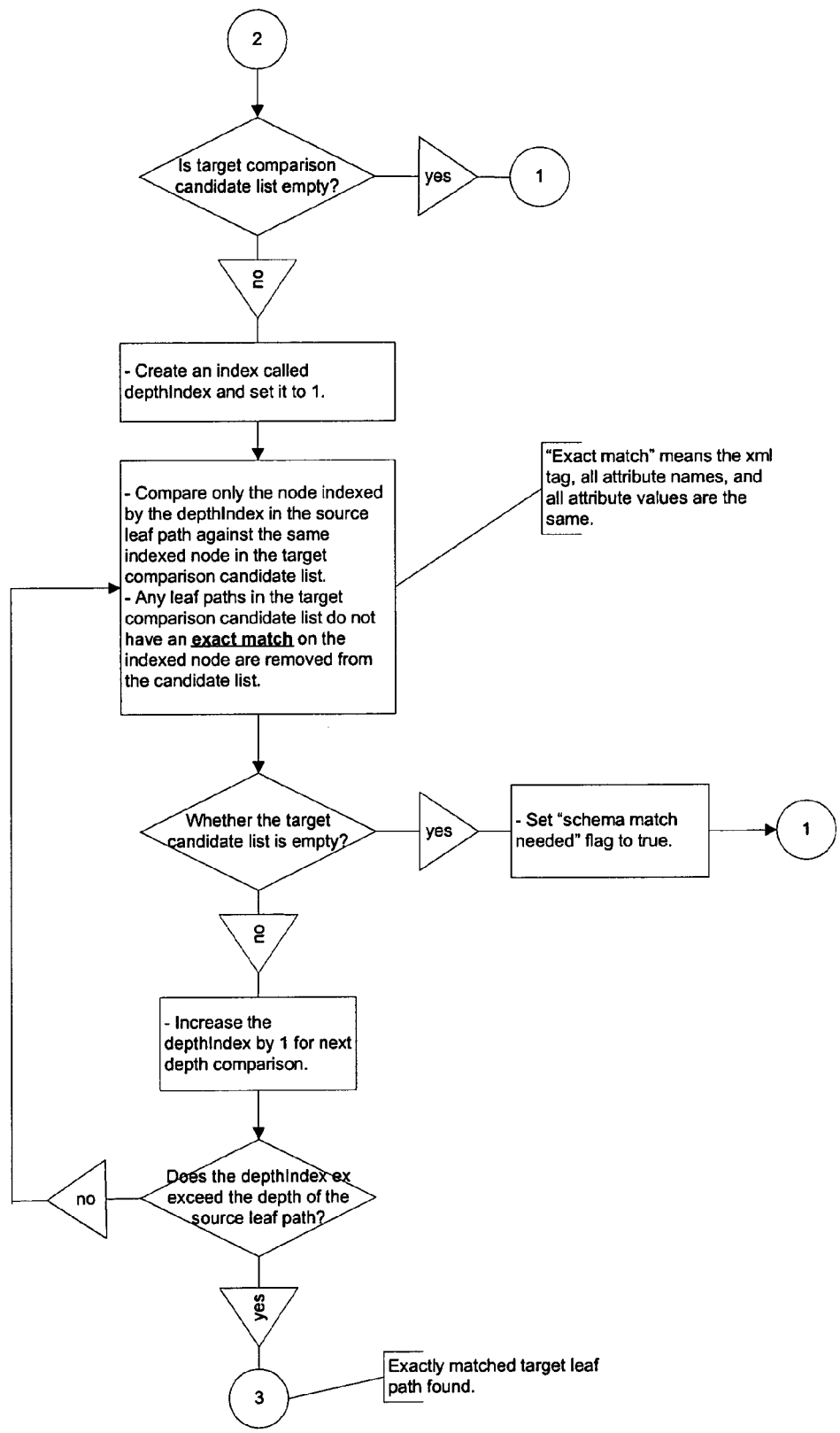
FIG. 4 illustrates a flow chart describing the steps of identifying exactly matched target leaf paths.
Figure 5:
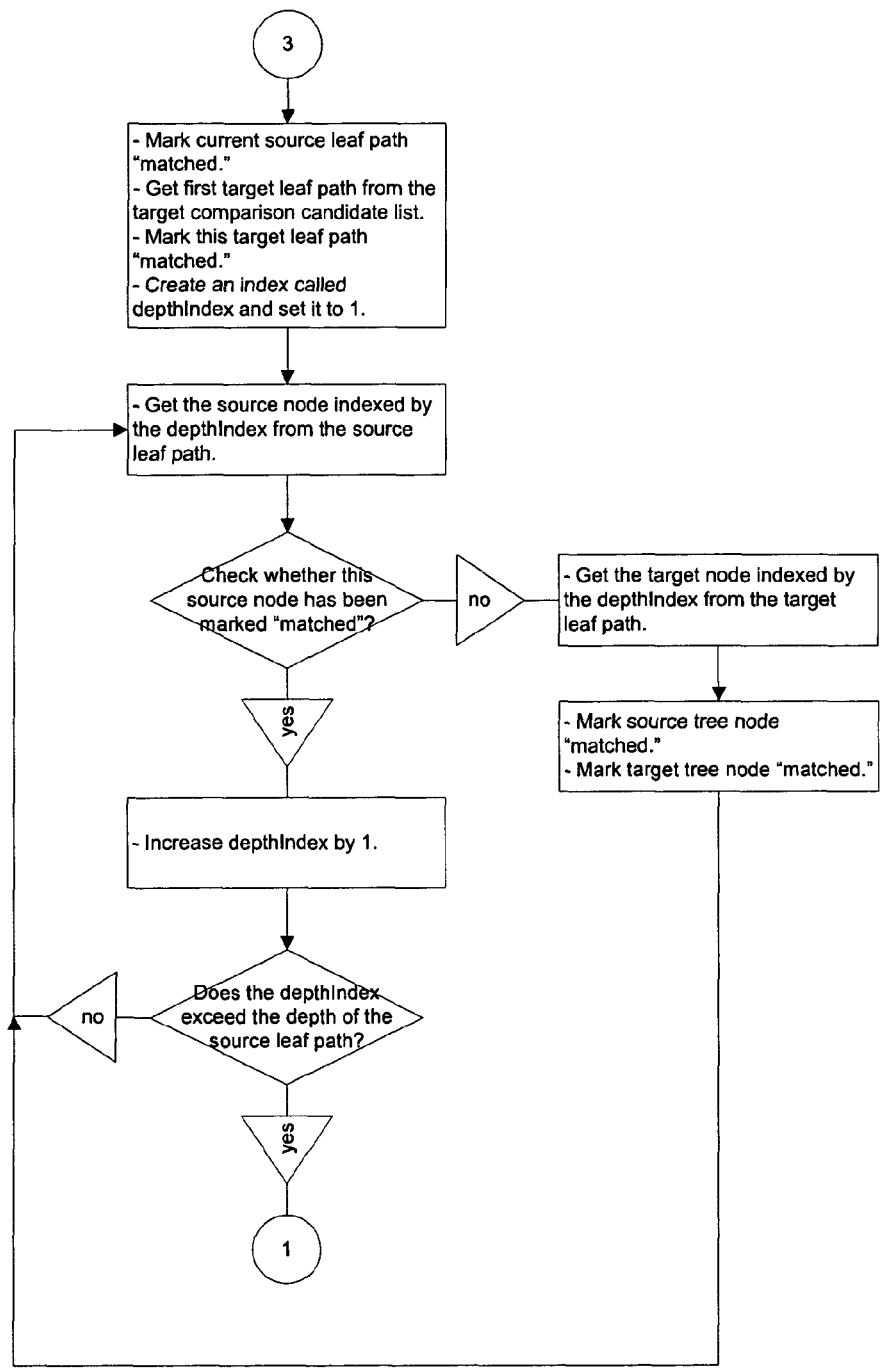
FIG. 5 illustrates a flow chart describing the steps of marking both source tree and target tree nodes for which an exact match has been attained.

In the embodiment of the invention depicted in FIGS. 3 through 5, source leaf paths present in the source table are individually and sequentially considered to determine if any corresponding exact matches exist among the target leaf paths. As illustrated in the flow chart of FIG. 3, an initial step in this matching process is the creation of a "target candidate list" each of whose entries contains target leaf paths that have the same depth as the source leaf path being currently considered (the entries in the target candidate list are referred to herein as "candidate leaf paths"). Entries in the target candidate list are then compared as depicted in FIG. 4 where each node of the source leaf path is compared with each node of a candidate leaf path. An exact match occurs between those nodes when the XML tag, all attribute names, and all attribute values are the same. For each candidate leaf path, once an exact match fails to occur between its node and the corresponding node of the source leaf path, that leaf path is removed from the candidate list.

For each source leaf path, this attempt to find an exact match yields two results: An exact match is found (indicated at circle 3 of FIG. 4) or a "schema match needed" flag is set. In the former case, each node of both the source and matched target leaf path is marked as being matched, as illustrated in FIG. 5.

Figure 6:
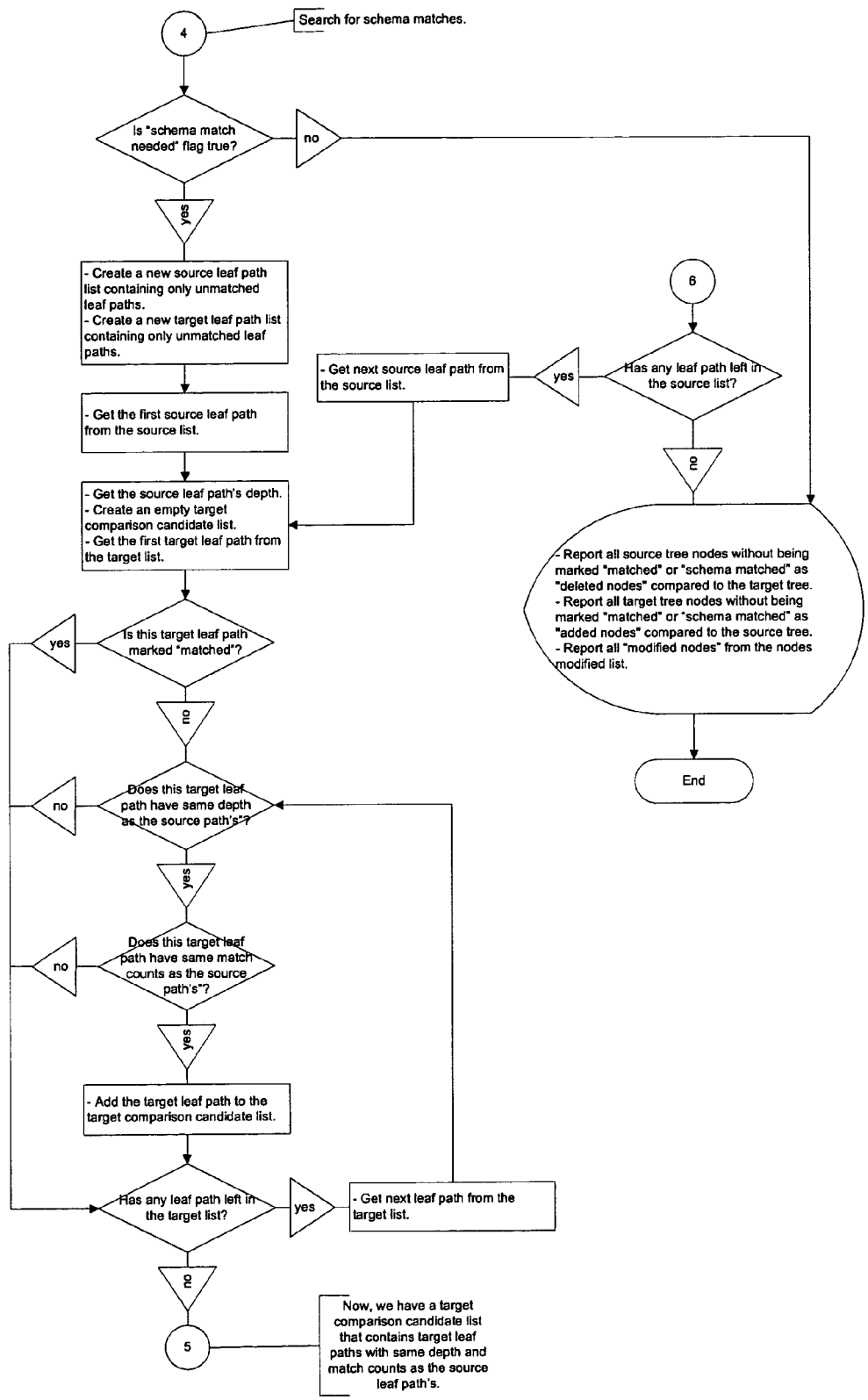
FIGS. 6 and 7 illustrate flow charts describing the steps of identifying and reporting "schema matched" as well as "exact matched" source tree nodes.
Figure 7:
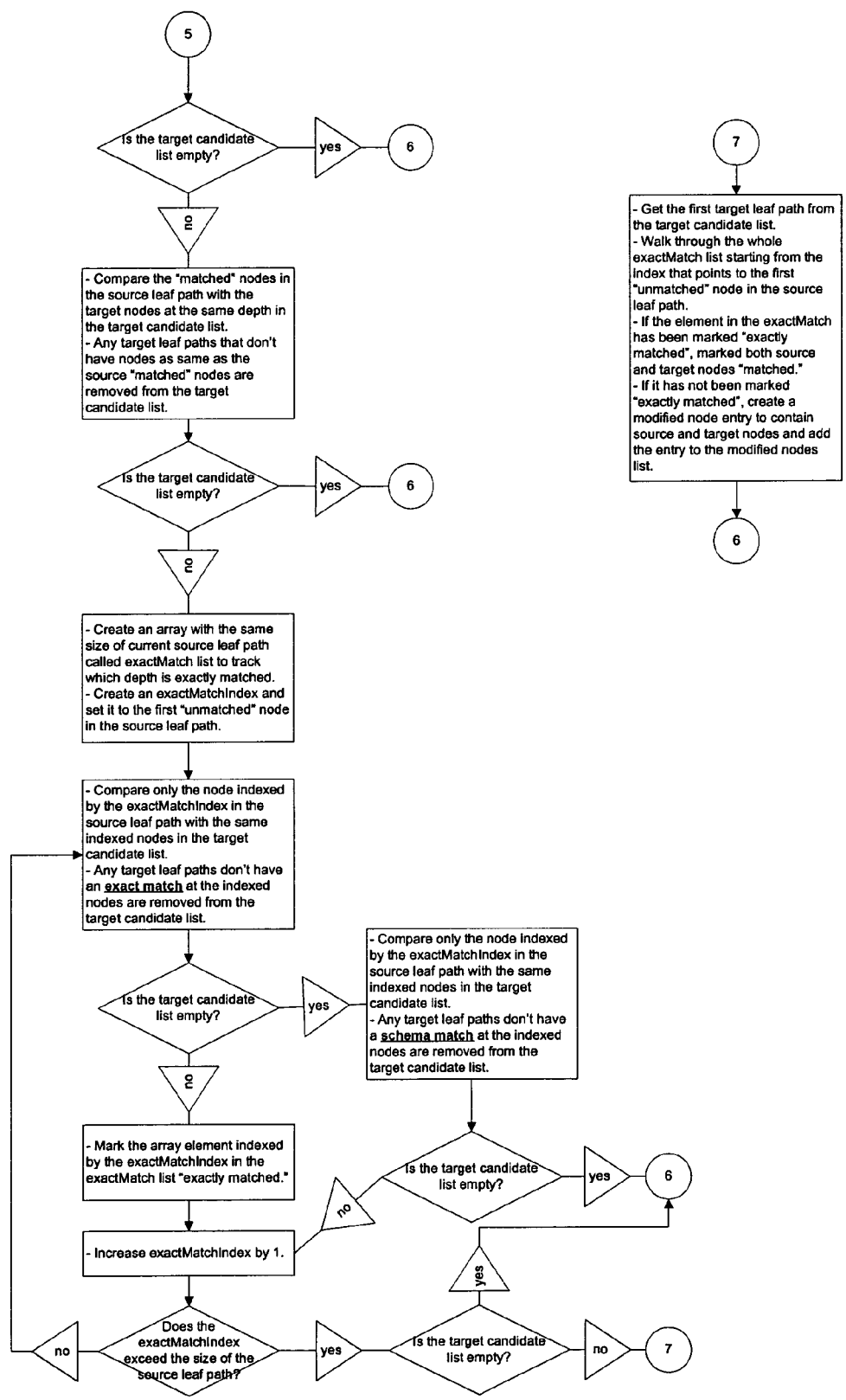

As illustrated in the embodiment of the invention depicted in FIGS. 3 through 5, source leaf paths in the source table are recursively searched for an exact match with target leaf paths. Once this process has been completed for all source leaf path entries in the source table, any existing "schema matches" are then determined. Only unmatched leaf paths in the source and target tables are considered to determine any "schema matches" between entries of these tables. FIGS. 6 and 7 illustrate in detail how this process is conducted. In general, loosely matched leaf paths are identified wherein at least one node from an entry in the source leaf path table has the same schema but different values of a corresponding node in a target leaf path table entry. In these loosely matched leaf paths, there may be completely matched nodes and loosely matched nodes. If found, all completely matched nodes in the leaf paths are flagged as being exactly matched and all schema matched nodes are flagged as being loosely matched nodes.

Once the schema matching process has been completed, the result of the document comparison is output to the user. In particular, all source tree nodes which have not been marked "matched" or "schema matched" are reported as being deleted as compared to the target document. Similarly all target tree nodes which have not been marked "matched" or "schema matched" are reported as "added" as compared to the source document. Further, all nodes which have been indicated as schema matched are reported as being modified.

Sample Application of the Invention

The above discussion and FIGS. 3-7 have discussed the operation of the invention in comparing two documents. To further illustrate the invention, two documents are compared, the source XML document depicted in FIG. 8A and the target XML document depicted in FIG. 8B.

Figure 9A:
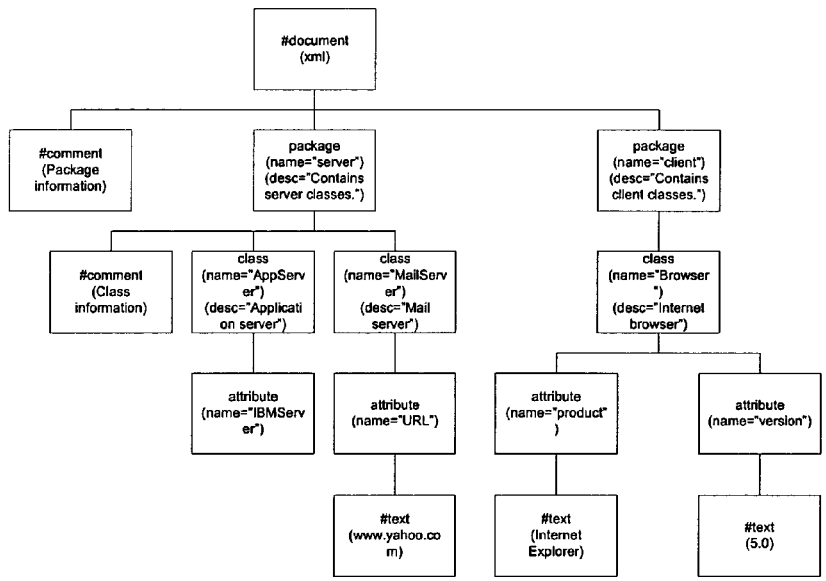
FIGS. 9A and 9B are DOM models corresponding to the FIGS. 8A and 8B, respectively.
Figure 9B:
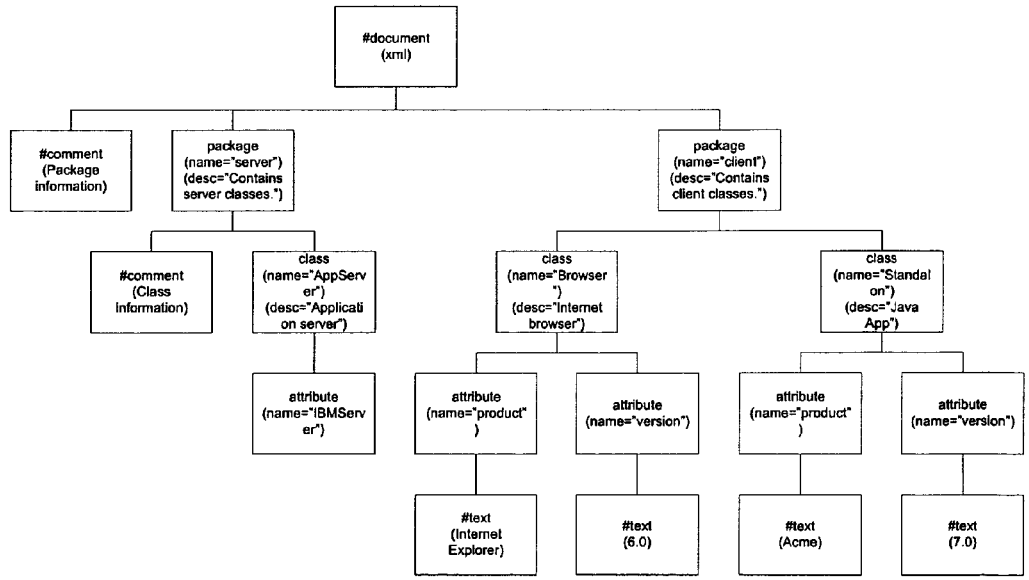

The respective XML files are parsed to create tree structures, DOM models that are depicted in FIGS. 9A and 9B. The tree structures are traversed to obtain all possible leaf paths, as shown in FIGS. 10A and 10B, respectively. In particular, six source leaf paths and seven target leaf paths are obtained.

The first source leaf path is compared against the seven target leaf paths. All target leaf paths with the same number of nodes as the first source leaf path are placed in a target comparison list:

First source leaf path entry:

| #1 | #document (xml) | #comment (Pakcage information) | Leaf Path Depth = 2 |
|---|---|---|---|

Target comparison candidate list (containing only one entry):

| #1 | #document (xml) | #comment (Pakcage information) | Leaf Path Depth = 2 |
|---|---|---|---|

The system then:

Compares the first node (#document) in the source leaf path with those in the target comparison candidate list.

If there are exact matches, they remain in the target comparison candidate list. Otherwise, they are deleted.

As a result of a successful first node match, the target comparison candidate list remains:

| #1 | #document (xml) | #comment (Pakcage information) | Leaf Path Depth = 2 |
|---|---|---|---|

The system then:

Compares the second node (#comment) in the source leaf path with those in the target comparison candidate list.

If there are exact matches, they remain in the target comparison candidate list. Otherwise, they are deleted.

As a result of a successful second node match, the target comparison candidate list again remains:

| # | #document (xml) | #comment (Pakcage information) | Leaf Path Depth = 2 |
|---|---|---|---|
| #1 | | | |

The system then:
Marks the source leaf path "matched."
Marks the first target leaf path in the comparison candidate list "matched."
Checks all the appropriate source and target nodes are marked "matched"—for all matched nodes of the same depth.

Figure 11A:
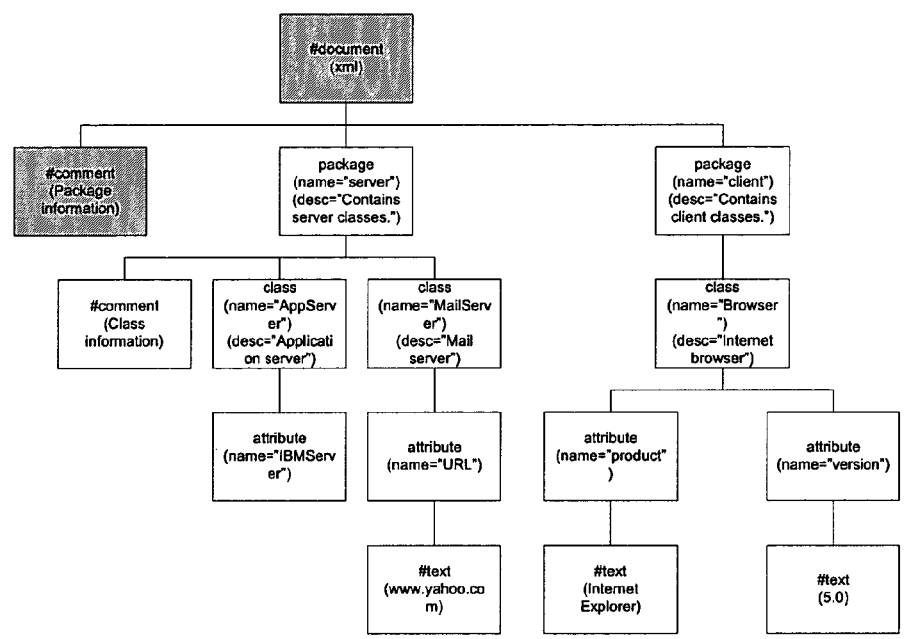
FIGS. 11A and 11B illustrate how an exact match of leaf paths was identified in each of the source and target DOM models.
Figure 11B:
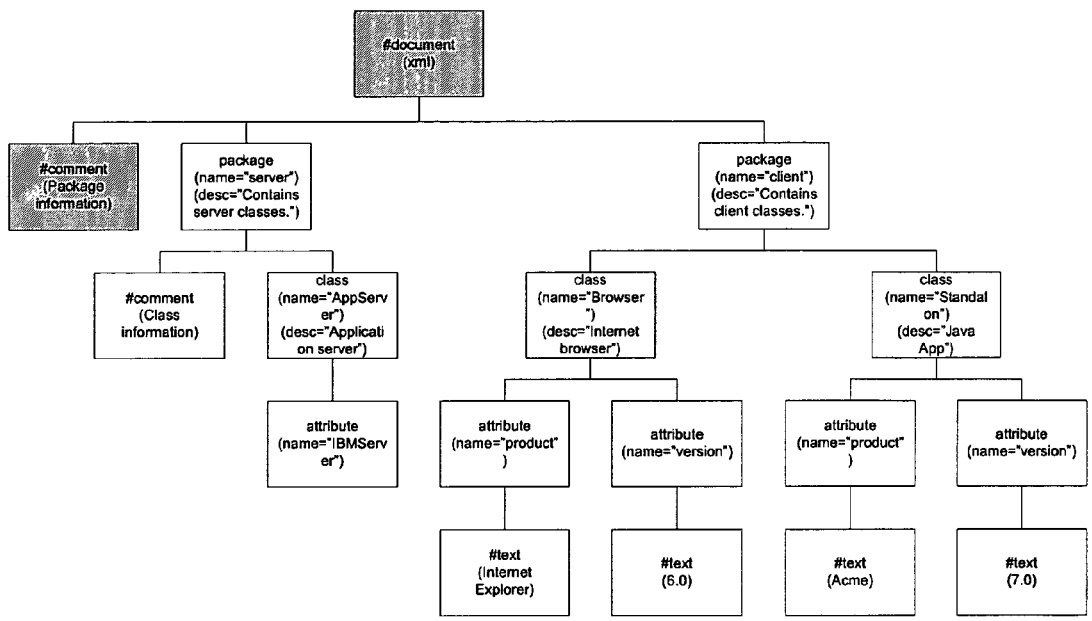
Figure 17A:
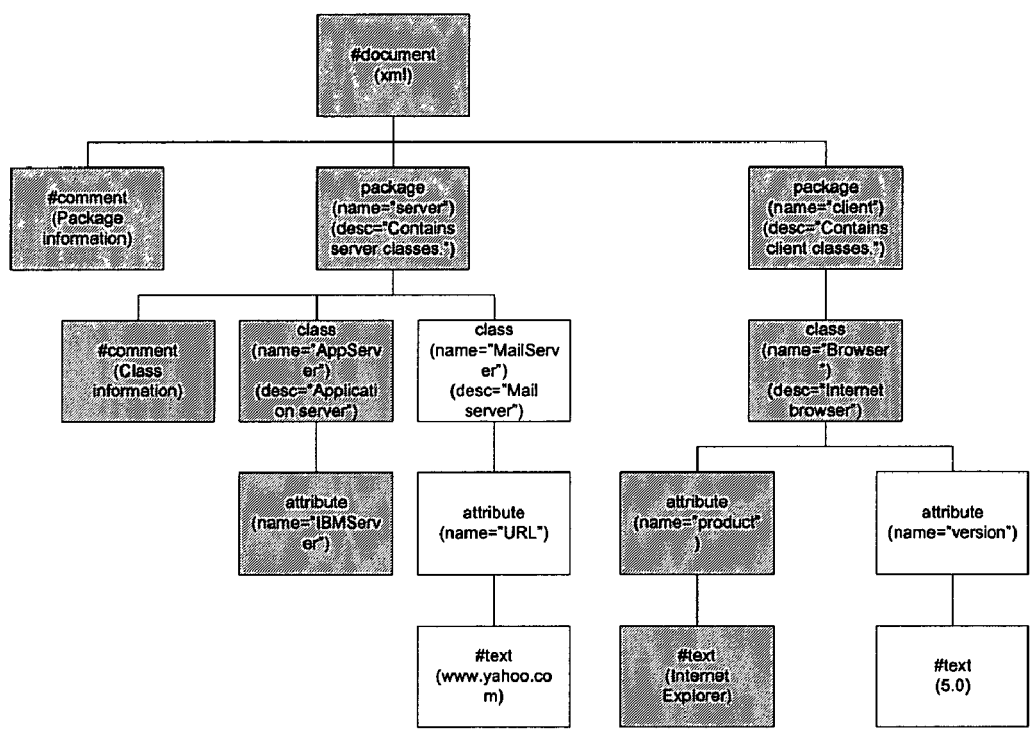
Figure 17B:
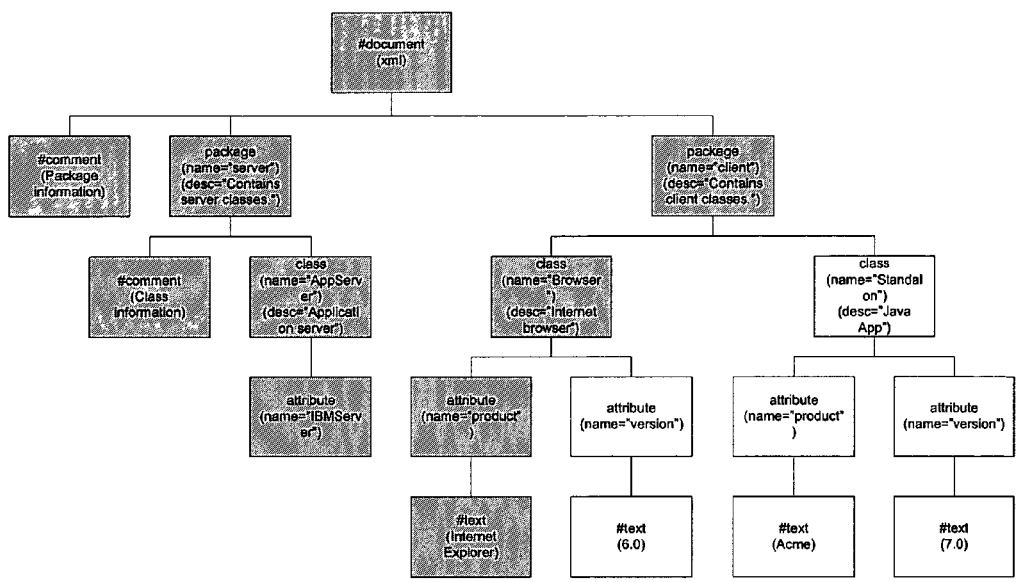
Figure 20A:
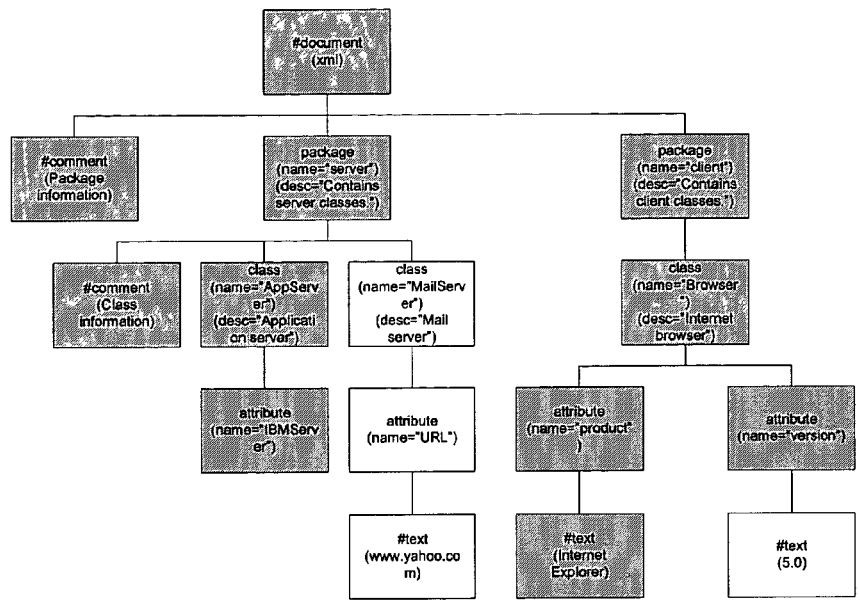
Figure 20B:
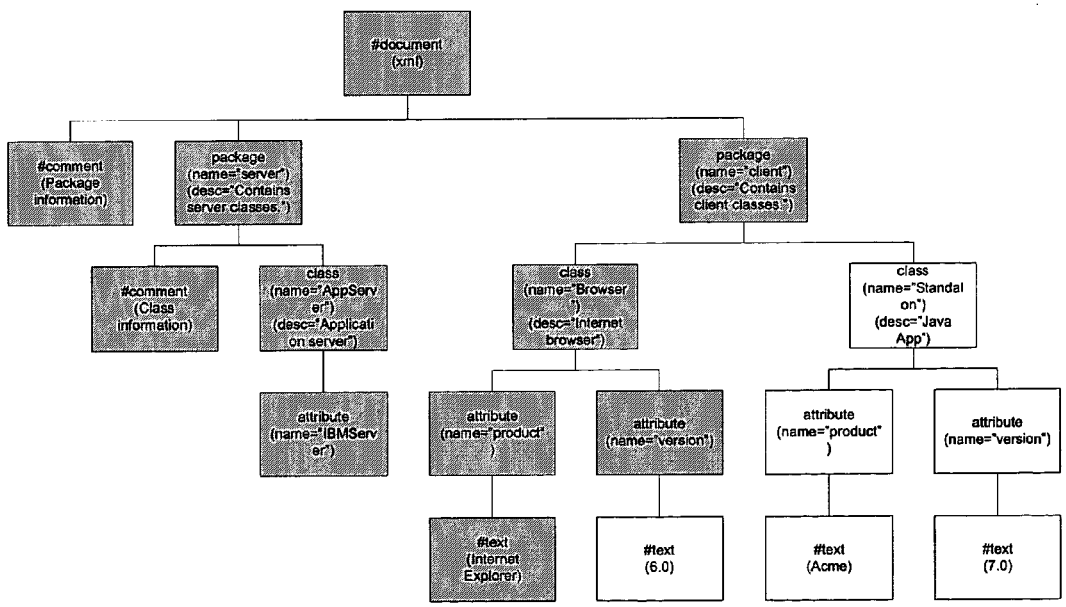

The results of this process are illustrated in FIGS. 11A and 11B with respect to the DOM models and FIGS. 12A and 12B with respect to the leaf path tables. In particular, the cross-hatched nodes indicate that they have been matched.

In a similar manner, the second source leaf path is compared with all the target leaf paths in an attempt to find an exactly matched target leaf path. It is clear from a visual inspection of the leaf path tables of FIGS. 10A and 10B that such an exact match exists—the leaf paths appearing in line 2 of both tables are identical. This match is identified and the corresponding nodes are marked as indicated in FIGS. 13A, 13B, 14A and 14B. That is, these figures now indicate all cumulate exact node matches found (i.e. they include the results attained and noted earlier in FIGS. 11A, 11B, 12A, and 12B).

Similarly, the third source leaf path is compared with all the target leaf paths and an exact match is found. The cumulative result of matched leaf nodes is depicted by FIGS. 15A, 15B, 16A, and 16B.

In comparing the fourth source leaf path, no exact match is found. The system flags this leaf path as needing a "schema match" search which will be conducted later upon conclusion of all exact matches being determined.

A comparison of the fifth source leaf path with all the target leaf paths yields an exactly matched target leaf path. The cumulative result of the exactly matched nodes appears in FIGS. 17A, 17B, 18A, and 18B.

The comparison of the sixth source leaf path finds no exactly matched target leaf path and, thus, the "schema match needed" flag is set. Since all source leaf paths have been processed, the actual schema match routine as illustrated in FIGS. 6 and 7 is applied against the example. In particular, a new table is created for each of the unmatched source leaf paths and the unmatched target leaf paths. These are illustrated in FIGS. 19A and 19B, respectively.

As in the exact match algorithm, each source leaf path in the table for schema match in the target leaf path table is serially processed. Only the source leaf path of interest needs to be compared with target leaf paths having the same depth and the same number of previously matched nodes. That is, for the first source leaf path appearing in the table, only target leaf paths of depth 5 and match count 2 need be considered. Accordingly, a target comparison candidate, list of target leaf paths possessing those attributes is created. In this example, only the second and third entries of the target leaf path table would be such candidates.

As illustrated in FIG. 7, the actual comparison commences by first determining that nodes indicated as being previously matched are in fact exactly matched to the corresponding nodes of the source leaf path of interest and the candidate target leaf path. If they are not, the candidate is removed from the candidate list. Thus, in this example, in comparing the first source leaf path with each of the candidate target leaf paths (i.e., the second and third leaf paths of FIG. 19B), the comparison fails and all candidates are removed from the list. Consequently, no schema match is found for the first source leaf path contained in FIG. 19A.

Applying the same procedure to the second source leaf path initially determines that only the first target leaf path need be a candidate (as it alone has a depth of 5 and a match count of 3). The next step, as before, is a comparison of the first 3 nodes of the second source leaf path with the first 3 nodes of the first target leaf path. This determines that each such node has an exactly matched counterpart. A check is then made to determine whether the remaining nodes of the candidate target leaf path (i.e., nodes at depth 4 and 5) are schema matched with those in the second source leaf path being evaluated. In this example they are so matched. As before, should no such match be found for a particular candidate, it is removed from the candidate list.

Figure 22A:
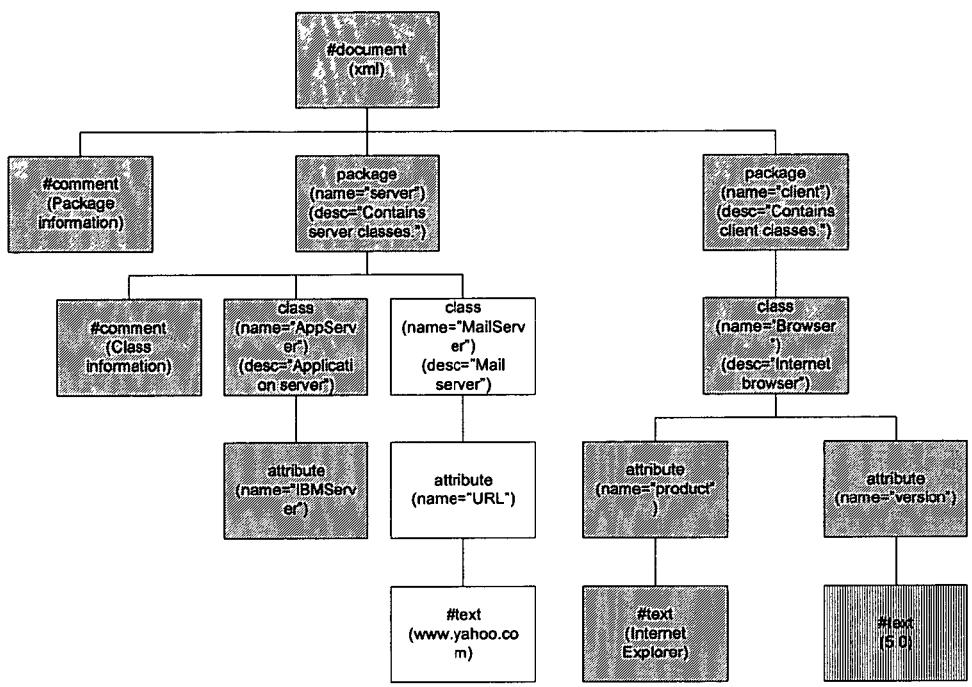
FIGS. 22A and 22B illustrate identification of a "schema match" in the DOM models; and, FIG. 23 illustrates an embodiment of the invention where the results of the file comparison are displayed by annotations to the original XML files.
Figure 22B:
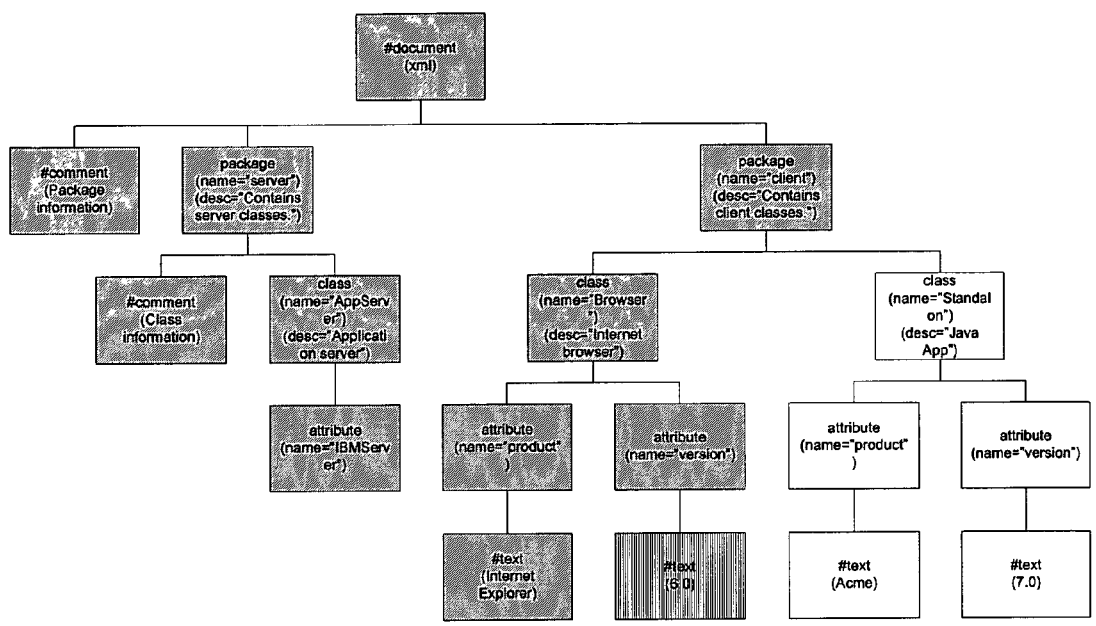

Should entries be present in the candidate list, a review is conducted of the nodes at depth 4 and 5 of each candidate to determine if they are exactly matched or schema matched, and flags the nodes accordingly. In this example, it is determined that the $4^{th}$ node of the source leaf path exactly matches the $4^{th}$ node of each candidate target leaf path (here, only one candidate is present). FIGS. 20A, 20B, 21A and 21B illustrate the cumulative result of the comparison of the two documents after this determination is made. A similar comparison of the corresponding $5^{th}$ nodes shows no exact match. Consequently, the $5^{th}$ node is flagged as "schema matched" to indicate a modified node entry is present (in this example, "#test (6.0)" as opposed to "#text(6.0)"). FIGS. 22A and 22B illustrate the final result of the comparison of the source and target DOM models wherein the vertical shading indicates a schema match has occurred.

Alternative embodiments of the invention envision a variety of output formats for the results of the comparison of the two documents. As the invention has application as a software development tool, an output in the form of annotated DOM models (e.g. FIGS. 22A and 22B) might be of particular usefulness to the user. Similarly, output comprising annotated source leaf path tables (e.g. FIGS. 18A and 18B) might be of value. FIG. 23 illustrates yet another output format in which the comparison results are shown as annotations to the original two documents. In this embodiment all unflagged nodes in the source document are bolded thereby indicating that with respect to the target document, they have been deleted. Similarly all unflagged nodes in the target document are bolded thereby indicating that with respect to the source document, they have been added. Loosely match leaf paths are reported as "modified nodes" between source and target by underlining the nodes in each document.

The above simple examples utilize a comparison of short, unsophisticated documents to illustrate aspects of the invention. In comparing more substantial documents the resulting output would yield significantly more reported differences. Additional embodiments of the invention permit the use of a filtering means in reporting those differences to allow the user to limit the output for specific purposes, e.g., to find a result sought without being inundated with a report containing all differences between the documents. Thus for example, a filter output may be set to limit the report to differences between the documents that relate only to nodes addressing "class name".

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of a workstation on which the documents to be compared are stored. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, FIGS. 1-23 support combinations of means for performing the specified functions, combinations of steps for performing the specified functions, and program instruction means for performing the specified functions.

Although the present invention has been described with respect to various embodiments of the invention, various changes and modifications may be suggested to one skilled in the art and it is intended that the present invention encompass such changes band modifications as fall within the scope of the appended claims.

I claim:

1. A method for comparing a source document with a target document, each document is capable of being parsed into a DOM (Document Object Model) tree, said method comprising the steps of:
    parsing the source document into a source DOM tree;
    parsing the target document into a target DOM tree;
    creating a source leaf path table from the source DOM tree;
    creating a target leaf path table from the target DOM tree, each of the tables containing leaf paths which comprise nodes;
    generating a comparison of the source document with the target document by
        identifying entries, within the target leaf path table, that exactly match entries in the source leaf path table,
        for each match found, labeling as exactly matched corresponding source and target leaf paths, and
        for only those leaf paths that have not been labeled as exactly matched, identifying whether or not schema matches exist between those leaf paths present in the source leaf path table and those leaf paths present in the target leaf path table; and
    outputting to a user the comparison of the documents.

2. The method of claim 1, wherein said identifying comprises:
    creating, for each entry in the source leaf path table, a candidate target leaf path list of all entries in the target leaf path table having the same depth as a source leaf path table entry selected to be matched, and
    searching the candidate target leaf path list for leaf paths that exactly match the selected source leaf path entry.

3. The method of claim 2, wherein
said searching comprises removing an entry from the candidate target leaf path list immediately upon a match failing to occur between a corresponding node of the entry and that of the source leaf path node.

4. The method of claim 2, further comprising
setting a matched node indicator on all corresponding nodes of each node contained in source and target leaf paths labeled as exactly matched.

5. The method of claim 4, wherein
said identifying only considers, for each source leaf path table entry to be schema matched, target leaf paths having the same depth and match count.

6. The method of claim 1, wherein
said outputting provides annotations on both the source document and the target document to indicate matching and non-matching portions resulting from the comparison of the two documents.

7. The method of claim 1, wherein
said outputting provides annotations on both the source DOM tree and the target DOM tree to indicate matching and non-matching portions resulting from the comparison of the two documents.

8. The method of claim 1, wherein
said outputting provides annotations on both the source leaf path table and the target leaf path table to indicate matching and non-matching portions resulting from the comparison of the two documents.

9. The method of claim 1, wherein
said outputting limits the outputted comparison of the documents to a comparison of nodes selected by the user.

10. A computer hardware device for comparing a source document with a target document, each document is capable of being parsed into a DOM (Document Object Model) tree, comprising:
    a memory storing the source document and the target document;
    at least one processor configured to perform:
        parsing the source document into a source DOM tree;
        parsing the target document into a target DOM tree;
        creating a source leaf path table from the source DOM tree;
        creating a target leaf path table from the target DOM tree, each of the tables containing leaf paths which comprise nodes;
        generating a comparison of the source document with the target document by
            identifying entries, within the target leaf path table, that exactly match entries in the source leaf path table,
            for each match found, labeling as exactly matched corresponding source and target leaf paths, and
            for only those leaf paths that have not been labeled as exactly matched, identifying whether or not schema matches exist between those leaf paths present in the source leaf path table and those leaf paths present in the target leaf path table; and
        outputting to a user the comparison of the documents.

11. The computer hardware device of claim 1, wherein the identifying comprises:
    creating, for each entry in the source leaf path table, a candidate target leaf path list of all entries in the target leaf path table having the same depth as a source leaf path table entry selected to be matched, and
    searching the candidate target leaf path list for leaf paths that exactly match the selected source leaf path entry.

12. The computer hardware device of claim 11, wherein the searching comprises removing an entry from the candidate target leaf path list immediately upon a match failing to occur between a corresponding node of the entry and that of the source leaf path node.

13. The computer hardware device of claim 11, wherein the at least one processor is further configured to perform
    setting a matched node indicator on all corresponding nodes of each node contained in source and target leaf paths labeled as exactly matched.

14. The computer hardware device of claim 13, wherein the identifying only considers, for each source leaf path table entry to be schema matched, target leaf paths having the same depth and match count.

15. The computer hardware device of claim 10, wherein the outputting provides annotations on both the source document and the target document to indicate matching and non-matching portions resulting from the comparison of the two documents.

16. The computer hardware device of claim 10, wherein the outputting provides annotations on both the source DOM tree and the target DOM tree to indicate matching and non-matching portions resulting from the comparison of the two documents.

17. The computer hardware device of claim 10, wherein the outputting provides annotations on both the source leaf path table and the target leaf path table to indicate matching and non-matching portions resulting from the comparison of the two documents.

18. The computer hardware device of claim 10, wherein the outputting limits the outputted comparison of the documents to a comparison of nodes selected by the user.

19. A computer-readable medium having stored therein computer usable program code for comparing a source document with a target document, each document is capable of being parsed into a DOM (Document Object Model) tree, the computer usable program code, which when executed by a computer hardware device, causing the computer hardware device to perform:
    parsing the source document into a source DOM tree;
    parsing the target document into a target DOM tree;
    creating a source leaf path table from the source DOM tree;
    creating a target leaf path table from the target DOM tree, each of the tables containing leaf paths which comprise nodes;
    generating a comparison of the source document with the target document by
        identifying entries, within the target leaf path table, that exactly match entries in the source leaf path table,
        for each match found, labeling as exactly matched the corresponding source and target leaf paths, and
        for only those leaf paths that have not been labeled as exactly matched,
    identifying whether or not schema matches exist between those leaf paths present in the source leaf path table and those leaf paths present in the target leaf path table; and
    outputting to a user the comparison of the documents.

20. The computer-readable medium of claim 19, wherein the identifying comprises:
    creating, for each entry in the source leaf path table, a candidate target leaf path list of all entries in the target leaf path table having the same depth as a source leaf path table entry selected to be matched, and
    searching the candidate target leaf path list for leaf paths that exactly match the selected source leaf path entry.

21. The computer-readable medium of claim 20, wherein the searching comprises removing an entry from the candidate target leaf path list immediately upon a match failing to occur between a corresponding node of the entry and that of the source leaf path node.

22. The computer-readable medium of claim 20, further comprising
    setting a matched node indicator on all corresponding nodes of each node contained in source and target leaf paths labeled as exactly matched.

23. The computer-readable medium of claim 22, wherein the identifying only considers, for each source leaf path table entry to be schema matched, target leaf paths having the same depth and match count.

24. The computer-readable medium of claim 19, wherein the outputting provides annotations on both the source document and the target document to indicate matching and non-matching portions resulting from the comparison of the two documents.

25. The computer-readable medium of claim 19, wherein the outputting provides annotations on both the source DOM tree and the target DOM tree to indicate matching and non-matching portions resulting from the comparison of the two documents.

26. The computer-readable medium of claim 19, wherein the outputting provides annotations on both the source leaf path table and the target leaf path table to indicate matching and non-matching portions resulting from the comparison of the two documents.

27. The computer-readable medium of claim 19, wherein the outputting limits the outputted comparison of the documents to a comparison of nodes selected by the user.

* * * * *